United States Patent [19]

Stendera et al.

[11] Patent Number: 4,981,821

[45] Date of Patent: Jan. 1, 1991

[54] LOW TEMPERATURE BINDER COMPOUND FOR REFRACTORY AGGREGATES AND REFRACTORY PRODUCTS OF IMPROVED COLD STRENGTH

[75] Inventors: James W. Stendera, Baltimore, Md.; Keith Bridger, Washington, D.C.; Thomas E. Roloson, Eldersburg, Md.

[73] Assignee: Martin Marietta Magnesia Specialties Inc., Hunt Valley, Md.

[21] Appl. No.: 271,657

[22] Filed: Nov. 16, 1988

Related U.S. Application Data

[63] Continuation-in-part of Ser. No. 207,199, Jun. 16, 1988, abandoned.

[51] Int. Cl.$^5$ ............................................. C04B 35/00
[52] U.S. Cl. ..................................... 501/94; 501/109; 501/111; 501/123
[58] Field of Search .................. 501/94, 109, 111, 123

[56] References Cited

U.S. PATENT DOCUMENTS 3,549,473  12/1970  Le Blanc et al. .
3,950,177   4/1976  Birchall et al. ................... 106/38.35

FOREIGN PATENT DOCUMENTS 2729077  1/1979  Fed. Rep. of Germany .
0034566 11/1975  Japan ..................................... 501/94
0038309  3/1976  Japan ..................................... 501/111

OTHER PUBLICATIONS

Derwent World Patent Index Access, No. 80-13502C/08, & JP, A, 55003317 (Nippon Chem) 11 Jan. 1980.
Derwent World Patent Index Access, No. 84-149502/24, & JP, A, 59078747 (Aishin Kako) 7 May 1984.
Chem Abstracts, vol. 81, 21 Oct. 1974, p. 271, No. 95656C, & JP, A, 7410967 (Nippon Chem) 14 Mar. 1974.

*Primary Examiner*—William R. Dixon, Jr.
*Assistant Examiner*—David M. Brunsman
*Attorney, Agent, or Firm*—Gay Chin; James B. Eisel; Alan G. Towner

[57] ABSTRACT

This invention relates to a phosphorous-containing organic binder compound for refractory ceramics, a process for the preparation of the binder compound, a pre-mixed, ready-to-use refractory/binder material having a long shelf-like, a method of using the pre-mixed refractory material, and a high strength refractory body produced from the pre-mixed refractory material.

68 Claims, No Drawings

LOW TEMPERATURE BINDER COMPOUND FOR REFRACTORY AGGREGATES AND REFRACTORY PRODUCTS OF IMPROVED COLD STRENGTH

CROSS-REFERENCE TO RELATED APPLICATION

This application is a continuation-in-part application of U.S. patent application Ser. No. 07/207,199, abandoned June 16, 1988.

BACKGROUND OF THE INVENTION

1. Field of the Invention:

This invention relates to phosphorous-containing organic binder compounds for refractory ceramics, a process for the preparation of suitable binder compounds, pre-mixed, ready-to-use refractory/binder materials having long shelve-lives, a method of using the pre-mixed refractory materials, and high strength refractory articles produced from the pre-mixed refractory materials.

2. Description of the Prior Art:

It is well known in the art that there are two general groups of refractory materials: Non-Basic Refractories, such as alumino silicates; and Basic Refractories, such as periclase, dead burned dolomite and magnesite, all of which are composed mainly of CaO and/or MgO.

Various materials have been used as low temperature (e.g., 400°-2000° F.) chemical binders in basic refractory products to impart a bond at temperatures too low for a direct bond to form through sintering. Good examples of these are sodium silicate, chromic acid and various inorganic phosphorous compounds. These compounds must be dissolved in a liquid medium to work effectively. For practical purposes, the liquid medium must be water since these binder materials are generally insoluble in non-aqueous media (e.g., organic solvents). In addition, most non-aqueous media also have other drawbacks such as flammability, toxicity and high price. These binder materials have been useful only in basic refractory products which are prepared on-site and used immediately. Water is used as the liquid media but it is in only brief contact with the basic aggregate since heat is applied to the mixture immediately after it is implaced to remove the water. Examples of such products are gunnables, rammables and castables that are sold in a dry form. Since such products are mixed with water on-site and used immediately, they are not required to exhibit a significant shelf life in the mixed or wet condition.

Premixed, ready-to-use, basic refractory ramming-/patching mixes having a chemical binder uniformly dispersed throughout the mixes via a liquid phase have not been successfully produced in the past. This is due to the fact that basic refractory aggregates are not stable over long periods of time in contact with water. Both MgO and CaO will react with water to form Mg(OH)$_2$ and Ca(OH)$_2$, respectively. These reactions present the following problems with a prewetted refractory mix:

1. Volume expansion related to hydration—disrupts refractory structure—degrades particles.
2. Hydration decreases free water content—bond begins to set prematurely.
3. Explosion hazard where hydrates are decomposed at high temperature.

Basic refractory materials cannot be premixed in an aqueous system and be expected to exhibit any shelf life. Basic refractories mixed in an aqueous system must be prepared on-site and used immediately to avoid the problems associated with hydration. In such on-site applications, the water is utilized only as the media for the implacement of the refractory. Heat is immediately applied to the mixture to remove the water.

U.S. Pat. No. 4,473,654 discloses the use of Li compounds in combination with organic materials such as drying oils to produce a premixed basic refractory with long shelf life. However, this patent does not depend upon phosphorous bonding between refractory aggregates, and further, the binder material requires at least 5% free CaO in order to work properly.

It has also been known to use organic materials such as phenolic resins and pitch to create a bond between basic refractory aggregates. However, phenolics and pitch have limited use since the bond depends on carbon which, under oxidizing conditions, burns out, thus causing the refractory article to lose its strength.

The use of inorganic phosphorous-containing compounds as basic refractory chemical binders is well known in the art; for example, aqueous solutions of sodium or potassium phosphates. Although such binders form strong chemical bonds with basic refractory aggregates, for practical purposes, such compounds are soluble only in water and have the drawbacks discussed above. To be effective, they must be dissolved in water. Therefore, any basic refractory/inorganic phosphate mixture must be prepared "on-site" and immediately used, thus displaying essentially no shelf life.

Japanese Patent No. 49-10,967 discloses the use of acidic phosphite binder materials for use with refractory ceramics. These binder materials form a suitable ceramic bond between non-basic refractory ceramics. However, because these binder materials contain acidic hydrogen, chemical reactions occur when these binder materials are used with basic refractory ceramics, and thus the refractory/binder mixture has essentially no shelf life. Furthermore, the phosphites disclosed in this patent tend to have a high vapor pressure, thus, it is likely that this material will evaporate before decomposing to form a phosphorous bond. Although this patent discloses the use of phosphite salts, it is believed that such salts are generally soluble only in water, thus prohibiting extended exposure of these materials to basic refractories, because of the hydration problems discussed above.

SUMMARY OF THE INVENTION

The present invention has been developed in view of the foregoing and to overcome the deficiencies of the prior art.

It is an object of the present invention to provide substantially non-aqueous neutral organic phosphate and phosphonate esters, their salts and homopolymers and copolymers thereof, to be used as binders for refractory ceramic aggregates, including, but not limited to, basic refractory ceramic aggregates.

It is a further object of the present invention to provide a process for the preparation of binder compounds suitable for purposes of the present invention.

Another object of the present invention is to provide a pre-mixed, ready-to-use refractory/binder compound material having a long shelf life.

Yet another object of the present invention is to provide a method of using the pre-mixed refractory material to build, rebuild and repair high temperature furnace linings used in steel melting and the like.

Still yet another object of the present invention is to provide a high strength refractory body formed from the pre-mixed refractory material.

DETAILED DESCRIPTION OF THE INVENTION

Several binder systems for use with ceramic refractory materials were investigated in an attempt to obtain a suitable binder phase that would fulfill the following criteria:

(1) the binder must be substantially non-reactive with refractory aggregates, especially basic refractory aggregates, over long periods of time at ambient temperatures (normal storage periods of refractory aggregate mixtures typically range from one week to two years);

(2) the binder must exist in a liquid phase or a solid phase soluble in an organic solvent;

(3) the binder upon heating must decompose, before boiling, to form reactive phosphorous containing species.

A preferred embodiment of the binder, in addition to the above criteria, is that the decomposition products of the binder be odor free and non-irritating to workers installing refractory products including the binder.

Various organic chemicals were tested which formed a phosphate or phosphonate bond. However, several of these organic phosphates and phosphonates readily reacted with basic refractory ceramics, and thus were unsuitable for providing a binder/aggregate mixture having a long shelf life.

The unsuitable compounds are typified by having acidic hydrogens as in the general phosphate and phosphonate structures respectively shown below.

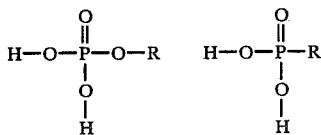

The presence of the acidic hydrogen groups caused these compounds to readily react with the basic refractory aggregates regardless of the nature of R where R is an organic group. Therefore, the phosphate or phosphonate binders should not contain acidic hydrogen groups.

After diligent efforts, the present inventors discovered a class of substantially non-aqueous, neutral, organic phosphonate esters, their salts, and polymers thereof, that do not readily react with basic refractories, but rather, form a stable binder phase at ambient temperatures. Accordingly, such a binder can be used to form a stable basic refractory aggregate/ binder mixture, which can be pre-mixed and stored with long shelf life.

This class of binder materials comprising neutral organic phosphate and phosphonate esters, their salts, and polymers thereof, are non-reactive with basic refractories at ambient temperatures, available in a liquid phase or solid phase which is soluble in an organic solvent, and decompose, before evaporating, upon heating to form a non-volatile phosphate containing compound.

The first "subclass" of these binder compounds are the neutral phosphate esters. This phosphate binder has the general structure shown below, wherein $R_1$ may or may not equal $R_2$, which in turn may or may not equal $R_3$ (hereinafter $R_1 =, \neq R_2 =, \neq (R_3)$.

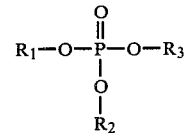

The organic groups $R_1$, $R_2$ and $R_3$ comprise alkyl groups, aryl groups, substituted alkyl groups, and substituted aryl groups. The alkyl, aryl, substituted alkyl, and substituted aryl groups are selected such that the phosphate esters fulfill criteria 2) and 3) listed above. Substituents on or within the alkyl (or aryl) groups include one or more of the following functional groups but are not limited to this list:

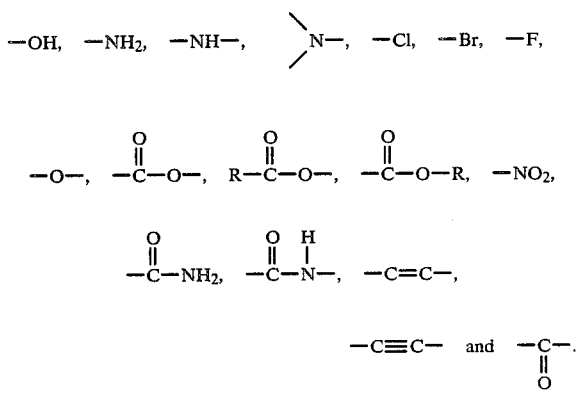

Additionally, $R_1$ may also be linked to $R_2$ or $R_3$ so that a cyclic group, like the one exemplified below, is present:

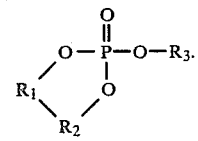

$R_1$, $R_2$ or $R_3$ may also be attached to other phosphate groups resulting in polyphosphates such as those exemplified below:

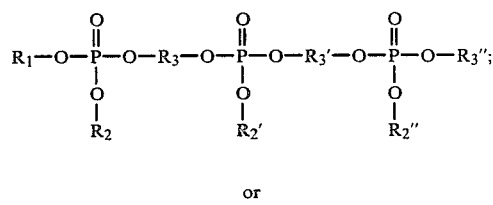

or

-continued

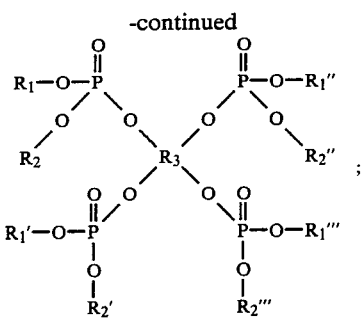

or even in a cyclic polyphosphate, for example,

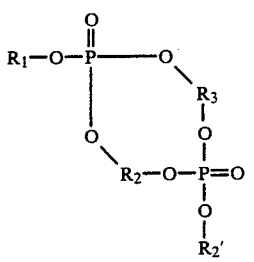

Note that in the compounds where there are a plurality of p groups, the $R_x$ (where x=1, 2, 3 or 4) groups and $R_x{}^n$ (where n=′, ″ or ‴) groups may or may not consist of the same constituents. Overall, the $R_x{}^n$ groups comprise the same constituents as the $R_x$ groups listed above.

Additionally, $R_1$, $R_2$ or $R_3$ may be polymeric. For example,

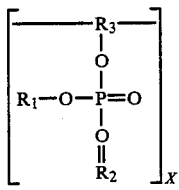

wherein X is the degree of polymerization ranging from 1 to 1,000. Further combinations of the above are also feasible. In addition, polymeric phosphates wherein the phosphate groups are directly linked together may also be used. For example,

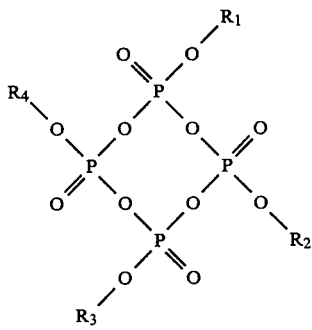

wherein $R_1 = , \neq R_2 = , \neq R_3 = , \neq R_4$.

The second "subclass" of these binder compounds are the neutral phosphonate esters. This phosphonate binder has the general structure shown below, wherein $R = , \neq R_2 = , \neq R_3$.

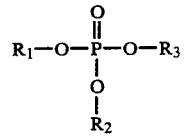

The selection and ranges for $R_1$, $R_2$ and $R_3$ are the same as in the phosphate "subclass" discussed above.

The third "subclass" of binder compounds covered by the present invention are the phosphonate salts having the general structure shown below, wherein $M_1 =$, $\neq M_2$.

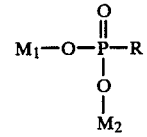

The phosphonate salts covered by the present invention are those wherein $M_1$ and $M_2$ are metal ions comprising sodium (Na), potassium (K), and lithium (Li). Other metal ions may be used so long as the resulting compound either exists in a liquid form or a solid form capable of being dissolved in an organic liquid. The selection and ranges for R are the same as for $R_1$, $R_2$ and $R_3$ described in the phosphate ester "subclass" above. Note that R, $R_1$, $R_2$ or $R_3$ may contain both phosphate and phosphonate groups so that mixed esters are also possible.

The preferred substituents are those containing oxygen, because binder compounds including such substituents generally produce harmless decomposition products (e.g., $CO_2$, $H_2O$, etc.), rather than the potentially irritating decomposition products (e.g., HCl, etc.) produced by some of the non-oxygen containing substituents. Further, the oxygen-containing substituents enable the binders to readily achieve the criteria listed above. Many of the binder compounds of the present invention as broadly described above are generally without an objectional odor and non-irritating, however, their decomposition products may not be so. In the case of hot-patching, where the patching mix is added to a hot furnace, the organic species are completely incinerated and exhausted through the plant fume collection system. Therefore, human exposure to the decomposition products is minimized. However, under certain circumstances when the furnace is relined, the interior lining can be hot enough to cause decomposition of the binder and the installation crew inside the furnace will be exposed to the vapors evolved. For this use it is essential that both the binder and its decomposition products be non-irritating and without an objectional odor. In the case of chlorinated phosphate esters, HCl is a major decomposition product and this vapor is an irritant. We have discovered that the above-listed technical criteria 1-3 can be satisfied by substituted phosphate esters having only oxygen in addition to carbon or hydrogen in the functional group, e.g., ethers (—O—) or alcohols (—OH). These esters decompose to $CO_2$ and $H_2O$ with little or no odor or irritation.

A preferred embodiment of the binder material includes any substance which fulfills criteria 1-3 listed above. A more preferred embodiment of the binder material includes neutral chlorinated phosphate esters, neutral chloroalkyl diphosphate esters, neutral chlorinated phosphonate esters, and mixtures thereof. The most preferred embodiment of the binder material includes neutral organophosphorous esters that contain only carbon, hydrogen, and oxygen in the organic groups, $R_x$.

Although a majority of the binder compounds covered by the present invention are commercially available in a form which fulfills the three criteria listed above, some of the compounds are not. However, such binders can be processed according to a method of the present invention, such that the binders will fulfill these criteria. This method is exhibited by way of the following example, but should not be construed to be limited thereto.

EXAMPLE 1

The structure shown below illustrates a commercially available polyamino phosphonate.

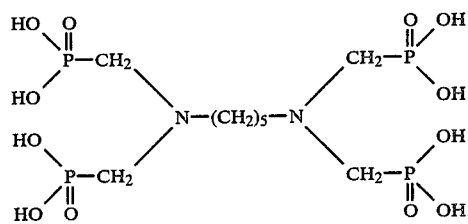

This compound is sold as a 50% solution in water. As purchased, this solution is strongly acidic and will not work for the purposes of the present invention.

According to a method of the present invention, such a solution is neutralized by addition of a base material, NaOH for instance, to a pH of not less than 10 and preferably, not less than 12. The solution is then distilled to remove substantially all of the water. The water is replaced by a commercially available organic solvent, such as ethylene glycol and the like. The resultant composition of the binder solution is 50–60% ethylene glycol, 10–20% $H_2O$, and the remainder being phosphonate.

This specific binder solution required the presence of 10–20% water in order to sufficiently dissolve the phosphonate binder in the glycol. A resultant refractory aggregate/binder mixture formed using this specific binder solution exhibited a shelf life of roughly 6 months and a refractory article produced from the mixture exhibited a relatively high cold crushing strength.

Although this example utilizes a glycol medium, many of the binder compounds covered by the present invention are commercially available in liquid form and thus, do not need to be dissolved in an organic solvent.

The binders of the present invention can be used with ceramic refractory aggregates to form pre-mixed, ready-to-use materials, which can be used to build, re-build, or repair furnace linings for industrial furnaces, and the like. An advantageous feature of the present invention is that the refractory aggregate/binder mixtures do not have to be prepared "on site" as do all other known aqueous basic refractory aggregate/binder mixtures. The present inventors were the first to discover a class of phosphorous containing binders which can be mixed with basic (as well as non-basic) refractory aggregates to form mixtures that can be stored for extended periods of time, in a pre-mixed, ready-to-use form, without undergoing degradations due to hydration or chemical reaction.

The binder of the present invention is added in a liquid form to refractory aggregates to form a pre-mixed, ready-to-use mixture as discussed above. The binder is preferably present in an amount between 0.1–20% wt. % and more preferably 0.1–10%. If less than 0.1 wt % of the binder is used, the aggregates will not sufficiently bond together. If more than 20 wt. % of the binder is used, the excess phosphorous will form a glassy phase and thus degrade the strength and heat resistance of a refractory article formed from the mixture.

The mixtures of the present invention are used for purposes well known in the refractory art. The mixture is applied, as needed, and then heated to a temperature greater than the decomposition temperature of the organic material, which is generally 500° F., to form a bond between the refractory aggregates. Generally, the constitutents of the alkyl and aryl groups, and the substituted alkyl and substituted aryl groups burn off, leaving reactive phosphorous species (i.e., phosphoric acid, acid phosphate, acid phosphonate, and the like) which react with the refractory aggregate to form a bond.

A method of using the refractory aggregate/binder mixture of the present invention comprises, preparing a pre-mixed refractory aggregate/binder mixture, allowing for storage of the mixture for an extended period of time, applying the mixture to the refractory lining of a furnace, and subsequently heat treating the mixture to form a bonded refractory body having high strength.

The present invention also provides a refractory body formed from the pre-mixed, ready-to-use refractory aggregate/binder mixture. As will be understood upon review of the examples below, a refractory body formed from the refractory aggregate/binder mixture of the present invention exhibits an high cold crushing strength.

The following examples are provided to describe and illustrate the present invention in greater detail. It is emphasized that these examples are purely illustrative and the present invention should not be construed to exclude other features not expressly presented in the examples.

EXAMPLE 2

A graded particle size distribution, as is well known in the refractory art, of high density 98% MgO periclase was mixed with 7 wt% of tris(2-chloropropyl) phosphate. Small cylinders were prepared by ramming in a manner essentially the same as described by ASTM Test C 181–82 "Workability Index of Fireclay and High Alumina Plastic Refractories". These cylinders, as well as all other samples hereinafter, were heat treated in a manner essentially the same as described by ASTM Test C856-77 "Firing Refractory Concrete Specimens" at 1000° F., 1800° F., 2500° F. and 2910° F. for five hours in an electrically heated furnace and cold crushing strengths of 2671 psi, 2487 psi, 4488 psi and 5114 psi were measured at each temperature, respectively.

EXAMPLE 3

Samples were prepared as in Example 2 above except that an 88% MgO aggregate was used. These samples were heat treated at 1000° F., 1800° F., 2500° F. and 2910° F., and displayed cold crushing strengths of 1361 psi, 1833 psi, 5514 psi, and 11,944 psi, respectively.

EXAMPLE 4

Samples were prepared as in Example 2 above except that the graded particle size distribution consisted of 50 wt. % of dead burned dolomite and the balance being 98% MgO periclase. These samples were heat treated to 1000° F., 1800° F., 2500° F. and 2910° F., and displayed cold crushing strengths of 1275 psi, 2204 psi, 5739 psi, and 7216 psi, respectively.

EXAMPLE 5

Samples were prepared containing the dolomite/periclase aggregate described in Example 4 above. These samples were mixed with 2-7 wt. % of tris(2-chloropropyl) phosphate and rammed in a manner similar to ASTM Test C 181-82. Samples were heat treated at 1000° F., 1800° F., 2500° F., and 2910° F. The cold crushing strength of each sample is shown below.

| Range | | 2% | 3% | 4% | 5% | 6% | 7% |
|---|---|---|---|---|---|---|---|
| COLD | (1000° F.) | 94 | 306 | 668 | 848 | 1085 | 1275 |
| CRUSHING | (1800° F.) | 150 | 433 | 965 | 1214 | 1658 | 2204 |
| STRENGTH | (2500° F.) | 1808 | 2543 | 2826 | 2722 | 4208 | 5739 |
| (PSI) | (2910° F.) | 4227 | 6476 | 7070 | 5803 | 6877 | 7216 |

EXAMPLE 6

Samples were prepared as in Example 2 above except that the fine aggregates included chromic oxide comprising 2% of the mixture by weight, and the balance being comprised of 2% silicon metal and 98% MgO periclase. The samples were heat treated at 1000° F., 1800° F., 2500° F. and 2910° F. and exhibited cold crushing strengths of 3747 psi, 2841 psi, 6011 psi and 7320 psi, respectively.

EXAMPLE 7

Samples were prepared as in Example 2 above and divided into 2 separate lots. Lot A was heat treated at 1000° F. after mixing and exhibited a cold crushing strength of 1318 psi. Lot B was allowed to age 4 months with no appearance of hardening, after which it was heat treated at 1000° F. and exhibited a cold crushing strength of 1526 psi.

EXAMPLE 8

A graded particle size distribution of high density 98% MgO periclase was mixed with 7 wt. % of a chloroethyl phosphate ester of dichloro neopentyl glycol. Small cylinders were prepared by ramming in a manner essentially the same as ASTM Test C 181-82. The samples were heat treated at 1000° F., 1800° F., 2500° F. and 2910° F., and displayed cold crushing strengths of 1223 psi, 1588 psi, 1724 psi and 1473 psi, respectively.

EXAMPLE 9

Samples were prepared as in Example 8 above except that an 88% MgO aggregate was used. The samples were heat treated at 1000° F., 1800° F., 2500° F. and 2910° F., and displayed cold crushing strengths of 1152 psi, 2051 psi, 3490 psi and 7376 psi, respectively.

EXAMPLE 10

Samples were prepared as in Example 8 above except that the coarse aggregate was dead burned dolomite comprising 50% of the mixture by weight and the balance comprising 98% MgO periclase. The samples were heat treated at 1000° F., 1800° F., 2500° F. and 2910° F., and displayed cold crushing strengths of 1408 psi, 1012 psi, 1581 psi and 2840 psi, respectively.

EXAMPLE 11

Samples were prepared as in Example 8 above except that only 3½ wt % of a chloroethyl phosphate ester of dichloro neopentyl glycol was used. The liquid level was brought up to 7 wt% by dilution with ethylene glycol. The samples were heat treated at 1000° F., 1800° F., 2500° F. and 2910° F., and displayed cold crushing strengths of 1022 psi, 967 psi, 1341 psi and 1513 psi, respectively.

EXAMPLE 12

Samples were prepared as in Example 8 above and divided into 2 separate lots. Lot A was heat treated at 1000° F. after mixing and displayed cold crushing strength of 2526 psi. Lot B was allowed to age 4 months with no appearance of hardening. Lot B was then heat treated at 1000° F. and displayed a cold crushing strength of 2201 psi.

EXAMPLE 13

Samples were prepared as in Example 2 above except that a soda neutralized polyamino phosphonic acid was used. The samples were heat treated at 1000° F., 1800° F., 2500° F. and 2910° F., and displayed cold crushing strengths of 685 psi, 531 psi, 3114 psi and 2488 psi, respectively.

EXAMPLE 14

Three graded particle size distributions, one containing 98% MgO periclase, one containing 88% MgO aggregate and one containing a mixture of 50 wt % dolomite and 50 wt % of 98% MgO periclase were mixed with 7 wt % of a mixture of chloropropyl and chloroethyl phosphate and phosphonates. Small samples were prepared by ramming and heat treated for five hours at 1000° F., 1800° F., 2500° F. and 2910° F.. Cold crushing results were as follows:

| Composition | | 98% MgO Periclase | 88% MgO | 50% Dolomite 50% Periclase |
|---|---|---|---|---|
| COLD | (1000° F.) | 3025 | 2471 | 3235 |
| CRUSHING | (1800° F.) | 3736 | 3455 | 4807 |
| STRENGTH | (2500° F.) | 4108 | 6505 | 7966 |
| (PSI) | (2910° F.) | 3934 | 14,850 | 12,719 |

EXAMPLE 15

Samples were prepared as in Example 2 above except that 7 wt. % of the following mixed phosphate/phosphonate ester

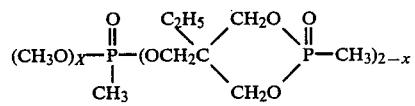

wherein X=0 or 1, was used in Sample A and 7 wt. % of a mixture of chloroethyl and chloropropyl phosphates, was used in Sample B. The samples were heat treated at 1000° F., 1800° F., 2500° F. and 2910° F. The cold crushing results were as follows:

| Composition |           | A    | B    |
|-------------|-----------|------|------|
| COLD        | (1000° F.)| 1965 | 1674 |
| CRUSHING    | (1800° F.)| 1803 | 2252 |
| STRENGTH    | (2500° F.)| 1131 | 2678 |
| (PSI)       | (2910° F.)| 1262 | 2222 |

EXAMPLE 16

Samples were prepared as in Example 2 above except that 50 wt.% 98% MgO periclase and 45-49 wt.% dead burned dolomite were mixed with 1-5 wt.% of: (A) tris(2-chloropropyl) phosphate; (B) propoxylated dibutyl pyrophosphoric acid; and C) tri (butoxyethyl) phosphate. The mixtures were heat treated at 1000° F., 1800° F., 2500° F. and 2910° F. and displayed cold crushing strengths as follows:

| Mix A |          | (5%) | (4%) | (3%) | (2%) | (1%) |
|-------|----------|------|------|------|------|------|
| Cold     | 1000° F. | 848  | 668  | 306  | 94   | 46   |
| Crushing | 1800° F. | 1214 | 965  | 433  | 150  | 96   |
| Strength | 2500° F. | 2722 | 2826 | 2543 | 1808 | 3584 |
| (PSI)    | 2910° F. | 5803 | 7070 | 6476 | 4227 | 3738 |
| Mix B |          |      | (4%) | (3%) | (2%) | (1%) |
| Cold     | 1000° F. |      | 995  | 291  | 286  | 195  |
| Crushing | 1800° F. |      | 1368 | 439  | 399  | 283  |
| Strength | 2500° F. |      | 3980 | 4358 | 3748 | 4345 |
| (PSI)    | 2910° F. |      | 5110 | 5008 | 4405 | 4910 |
| Mix C |          |      | (4%) | (3%) | (2%) | (1%) |
| Cold     | 1000° F. |      | 635  | 348  | 120  | 14   |
| Crushing | 1800° F. |      | 776  | 470  | 160  | 29   |
| Strength | 2500° F. |      | 6191 | 3967 | 3333 | 1806 |
| (PSI)    | 2910° F. |      | 9206 | 5708 | 5864 | 4600 |

While each of the binders utilized in the preceding examples are monomer compounds, use of polymer or copolymer compounds comprising these materials is entirely within the scope of the present invention. Additionally, as noted above in the Examples, mixtures of the phosphate esters, phosphonate esters and phosphonate salts are well within the scope of the present invention, for example, a mixture of chloropropyl and chloroethyl phosphate and phosphonate.

Although the invention has been described with a certain degree of particularity, it is understood that the present invention is not to be limited to the precise disclosure contained herein, but may otherwise be embodied with various changes, modifications and improvements which may occur to those skilled in the art, without departing from the scope of the invention as defined in the appended claims.

What is claimed is:

1. A substantially non-aqueous refractory aggregate and binder mixture having long shelf-life comprising:
   0.1-20 weight percent of a binder consisting of a neutral phosphorous containing organic binder compound selected from the group consisting of phosphonate esters, phosphonate salts, non-metal containing chlorinated phosphate esters, and tri(-butoxyethyl) phosphate, or a homopolymer or copolymer thereof; and
   80-99.9 weight percent of a refractory aggregate;
   wherein said binder compound forms, upon heating, a phosphorous containing bond between said refractory aggregates.
2. A mixture according to claim 1, wherein said refractory aggregates are basic refractory aggregates.
3. A mixture according to claim 2, wherein said basic refractory aggregates comprise, as a major constituent, at least one aggregate selected from the group consisting of periclase, dead burned dolomite, magnesite, and combinations thereof.
4. A mixture according to claim 1, wherein said binder compound is present in a liquid phase or a solid phase dissolved in a liquid organic medium.
5. A mixture according to claim 1, wherein said binder compound is present in an amount between 0.1-10 weight percent.
6. A substantially non-aqueous refractory aggregate and binder mixture having a long shelf life comprising:
   0.1-20 weight percent of a binder consisting essentially of a phosphate ester selected from the group consisting of neutral non-metal containing chlorinated phosphates and tri(butoxyethyl) phosphate; and
   80-99.9 weight percent of a refractory aggregate;
   wherein said binder compound forms, upon heating, a phosphate containing bond between said refractory aggregates.
7. A mixture according to claim 6, wherein said refractory aggregates are basic refractory aggregates.
8. A mixture according to claim 7, wherein said basic refractory aggregate comprise, as a major constituent, at least one aggregate selected from the group consisting of periclase, dead burned dolomite, magnesite, and combinations thereof.
9. A mixture according to claim 6, wherein said binder compound is present in a liquid phase or a solid phase dissolved in a liquid organic medium.
10. A mixture according to claim 6, wherein said binder compound is present in an amount between 0.1-10 weight percent.
11. A mixture according to claim 6, wherein said binder compound consists essentially of tris(2-chloropropyl) phosphate.
12. A mixture according to claim 6, wherein said binder consists essentially of a mixture of chloroethyl and chloropropyl phosphate ester.
13. A mixture according to claim 6, wherein said binder compound comprises neutral chloroalkyl diphosphate esters.
14. A mixture according to claim 13, wherein said binder consists essentially of chloroethyl phosphate ester of dichloro neopentyl glycol.
15. A substantially non-aqueous refractory aggregate and binder mixture having a long shelf life comprising:
    0.1-20 weight percent of a binder compound comprising a phosphonate ester having the structure

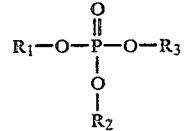

wherein $R_1 =, \neq R_2 =, \neq R_3$ and $R_1$, $R_2$ and $R_3$ comprise alkyl groups, aryl groups, substituted alkyl groups and substituted aryl groups, wherein the substituents on or within the alkyl or aryl groups are selected from the group consisting of

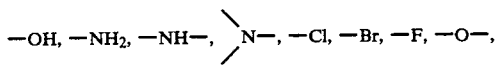

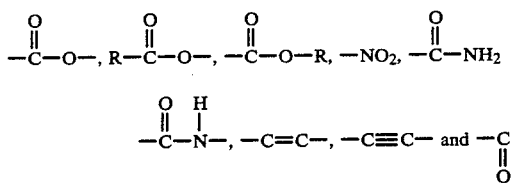

80-99.9 weight percent of a refractory aggregate; wherein said binder compound forms, upon heating, a phosphorous containing bond between said refractory aggregates.

16. A mixture according to claim 15, wherein the R groups interact to form cyclic groups, polyphosphonates and cyclic polyphosphonates.

17. A mixture according to claim 15, wherein the R groups are polymeric.

18. A mixture according to claim 15, wherein said refractory aggregates comprise basic refractory aggregates.

19. A mixture according to claim 18, wherein said basic refractory aggregates comprise, as a major constituent, at least one aggregate selected from the group consisting of periclase, dead burned dolomite, magnesite, and combinations thereof.

20. A mixture according to claim 15, wherein said binder compound is present in a liquid phase or a solid phase dissolved in a liquid organic medium.

21. A mixture according to claim 15, wherein said binder compound is present in an amount between 0.1-10 weight percent.

22. A substantially non-aqueous refractory aggregate and binder mixture having a long shelf life comprising:
    0.1-20 weight percent of a binder compound comprising a phosphonate salt having the structure

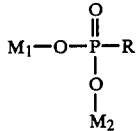

wherein $M_1 =$, $\neq M_2$, $M_1$ and $M_2$ are selected from the group consisting of $Na^+$, $K^+$ and $Li^+$, and R comprises an alkyl group, aryl group, substituted alkyl group or substituted aryl group, wherein the substituents on or within the alkyl or aryl groups are selected from the group consisting of

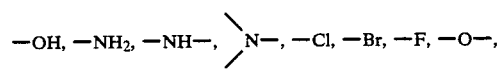

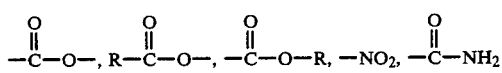

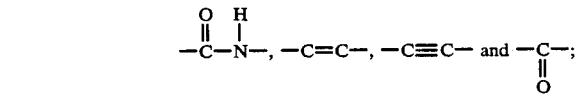

and
80-99.9 weight percent of a refractory aggregate; wherein said binder compound forms, upon heating, a phosphorous containing bond between said refractory aggregates.

23. A mixture according to claim 22, wherein the R group interacts with other phosphonate salt groups to form polyphosphonate salts.

24. A mixture according to claim 22, wherein the R group is polymeric.

25. A mixture according to claim 22, wherein said refractory aggregates are basic refractory aggregates.

26. A mixture according to claim 25, wherein said basic refractory aggregates comprise, as a major constituent, at least one aggregate selected from the group consisting of periclase, dead burned dolomite, magnesite, and combinations thereof.

27. A mixture according to claim 22, wherein said binder compound is present in a liquid phase or a solid phase dissolved in a liquid organic medium.

28. A mixture according to claim 22, wherein said binder compound is present in an amount between 0.1-10 weight percent.

29. A mixture according to claim 22, wherein said binder compound comprises soda neutralized phosphonic acids.

30. A mixture according to claim 21, wherein said binder compound consists essentially of soda neutralized polyamino phosphonic acid.

31. A substantially non-aqueous refractory aggregate and binder mixture having a long shelf-life, comprising a binder consisting essentially of a neutral phosphorous containing organic binder compound selected from the group consisting of phosphonate esters, phosphonate salts, non-metal containing chlorinated phosphate esters, and tri(butoxyethyl) phosphate, or a homopolymer or copolymer thereof, wherein said binder is substantially non-reactive with refractory aggregates at ambient temperatures, exists in a liquid phase or a solid phase soluble in an organic solvent, and upon heating decomposes, before boiling, to form reactive phosphorous containing species.

32. A mixture according to claim 31, wherein said binder compound is non-halogenated.

33. A mixture according to claim 31, wherein said binder compound consist essentially of mixtures of said phosphonate esters, phosphonate salts, non-metal containing chlorinated phosphate esters, and tri(butoxyethyl) phosphate.

34. A mixture according to claim 33, wherein said binder compound consists essentially of a mixture of chloropropyl phosphate and chloroethyl phosphonate ester.

35. A high strength, structurally rigid refractory article produced by a method comprising:
    mixing 0.1-20 weight percent of a binder compound with 80-99.9 weight percent of a refractory aggregate to form a substantially non-aqueous mixture, said binder compound comprising a neutral phosphorous containing organic compound selected from the group consisting of phosphonate esters, phosphonate salts, non-metal containing chlorinated phosphate esters, and tri(butoxyethyl) phosphate, or a homopolymer or copolymer thereof;
    ramming said mixture to form a molded refractory article; and
    heating said molded refractory article to decompose said binder compound;

said article having a phosphorous containing bond between the refractory aggregates and having a useful cold crushing strength.

36. A refractory article according to claim 35, wherein said article is heated at a temperature greater than 500° F.

37. A refractory article according to claim 35, wherein said refractory aggregate is a basic refractory aggregate.

38. A refractory article according to claim 37, wherein said basic refractory aggregates comprise, as a major constituent, at least one aggregate selected from the group consisting of periclase, dead burned dolomite, magnesite, and combinations thereof.

39. A refractory article according to claim 35, wherein said binder compound is present in a liquid phase or a solid phase dissolved in a liquid organic medium.

40. A refractory article according to claim 35, wherein said binder compound is present in an amount between 0.1-10 weight percent.

41. A high strength, structurally rigid refractory article produced by a method comprising:
mixing 0.1-20 weight percent of a binder compound, with 80-99.9 weight percent of a refractory aggregate to form a mixture, said binder compound comprising a phosphate ester selected from the group consisting of neutral non-metal containing chlorinated phosphates and tri(butoxyethyl) phosphate;
ramming said mixture to form a molded refractory article; and
heating said molded refractory article to decompose said binder compound;
said article having a phosphorous containing bond between the refractory aggregates and having a useful cold crushing strength.

42. A refractory article according to claim 41, wherein said article is heated at a temperature greater than 500° F.

43. A refractory article according to claim 41, wherein said refractory aggregate is a basic refractory aggregate.

44. A refractory article according to claim 43, wherein said basic refractory aggregates comprise, as a major constituent, at least one aggregate selected from the group consisting of periclase, dead burned dolomite, magnesite, and combinations thereof.

45. A refractory article according to claim 41, wherein said binder compound is present in a liquid phase or a solid phase dissolved in a liquid organic medium.

46. A refractory article according to claim 45, wherein said binder compound is present in an amount between 0.1-10 weight percent.

47. A refractory article according to claim 41, wherein said binder compound consists essentially of tris(2-chloropropyl) phosphate.

48. A refractory article according to claim 41, wherein said binder compound consists essentially of a mixture of chloroethyl and chloropropyl phosphate ester.

49. A refractory article according to claim 41, wherein said binder compound comprises neutral chloroalkyl diphosphate esters.

50. A refractory article according to claim 49, wherein said binder compound consists essentially of chloroethyl phosphate ester of dichloro neopentyl glycol.

51. A high strength, structurally rigid refractory article produced by a method comprising:
mixing 0.1-20 weight percent of a binder compound with 80-99.9 weight percent of a refractory aggregate to form a substantially non-aqueous mixture, said binder compound comprising a phosphonate ester having the structure

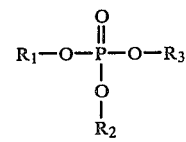

wherein $R_1 =, \neq R_2, \neq R_3$ and $R_1$, $R_2$ and $R_3$ comprise alkyl groups, aryl groups, substituted alkyl groups, and substituted aryl groups, wherein the substituents on or within the alkyl or aryl groups are selected from the group consisting of

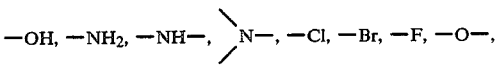

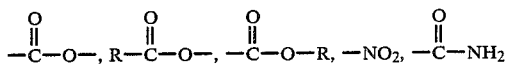

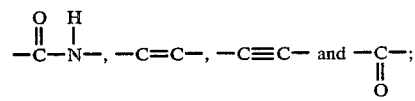

and
ramming said mixture to form a molded refractory article; and
heating said molded refractory article to decompose said binder compound;
said article having a phosphorous containing bond between the aggregates and having a useful cold crushing strength.

52. A refractory article according to claim 51, wherein the R groups interact to form cyclic groups, polyphosphonates and cyclic polyphosphonates.

53. A refractory article according to claim 51, wherein the R groups are polymeric.

54. A refractory article according to claim 51, wherein said article is heated at a temperature greater than 500° F.

55. A refractory article according to claim 51, wherein said aggregate is a basic refractory aggregate.

56. A refractory article according to claim 51, wherein said basic refractory aggregates comprise, as a constituent, at least one aggregate selected from the group consisting of periclase, dead burned dolomite, magnesite, and combinations thereof.

57. A refractory article according to claim 51, wherein said binder compound is present in a liquid phase or a solid phase dissolved in a liquid organic medium.

58. A refractory article according to claim 51, wherein said binder compound is present in an amount between 0.1-10 weight percent.

59. A high strength, structurally rigid refractory article produced by a method comprising:
mixing 0.1-20 weight percent of a binder compound with 80-99.9 weight percent of a refractory aggregate to form a substantially non-aqueous mixture, said binder compound comprising a phosphonate salt having the structure

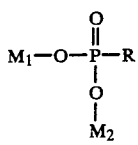

wherein $M_1 = , \neq M_2$, $M_1$ and $M_2$ are selected from the group consisting of $Na^+$, $K^+$ and $Li^+$, and R comprises an alkyl group, aryl group, substituted alkyl group or substituted aryl group, wherein the substituents on or within the alkyl or aryl groups are selected from the group consisting of

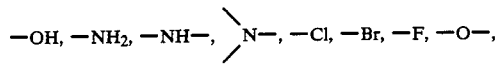

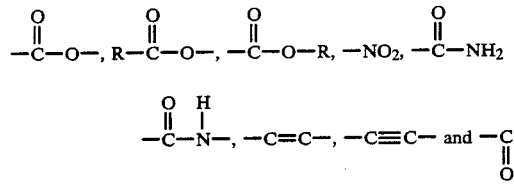

and ramming said mixture to form a molded refractory article; and heating said molded refractory article to decompose said binder compound;

said article having a phosphorous containing bond between the refractory aggregates and having a useful cold crushing strength.

60. A refractory article according to claim 59, wherein the R group interacts with other phosphonate salt groups to form polyphosphonate salts.

61. A refractory article according to claim 59, wherein the R group is polymeric.

62. A refractory article according to claim 59, wherein said article is heated at a temperature greater than 500° F.

63. A refractory article according to claim 59, wherein said refractory aggregate is a basic refractory aggregate.

64. A refractory article according to claim 63, wherein said basic refractory aggregates comprise, as a major constituent, at least one aggregate selected from the group consisting of periclase, dead burned dolomite, magnesite, and combinations thereof.

65. A refractory article according to claim 59, wherein said binder compound is present in a liquid phase or a solid phase dissolved in a liquid organic medium.

66. A refractory article according to claim 59, wherein said binder compound is present in an amount between 0.1-10 weight percent.

67. A refractory article according to claim 59, wherein said binder compound comprises soda neutralized phosphonic acids.

68. A refractory article according to claim 67, wherein said binder compound consists essentially of soda neutralized polyamino phosphonic acid.

* * * * *

UNITED STATES PATENT AND TRADEMARK OFFICE
CERTIFICATE OF CORRECTION

PATENT NO. : 4,981,821

DATED : January 1, 1991

INVENTOR(S) : James W. Stendera, Keith Bridger and Thomas E. Roloson

It is certified that error appears in the above-identified patent and that said Letters Patent is hereby corrected as shown below:

Column 3, line 52, after "ganic" add --phosphate and--.
Column 11, line 56, after "consisting" add --essentially--.
Column 12, line 28, "aggregate" should read --aggregates--; line 59, that portion of the formula reading "$R_1-O-P-O-R_3$" should read -- $R_1-O-P-R_3$ --; line 64, delete "$R_1=,\neq R_2=,\neq R_3$ and";
line 64, after "and $R_3$" add --, which may be the same or different,--.
Column 13, line 49, delete "$M_1=,\neq M_2,$"; after "and $M_2$" add --, which may be the same or different,--.
Column 14, line 27, "21" should read --29--; line 46, "consist" should read --consists--.
Column 16, line 11, that portion of the formula reading "$R_1-O-P-O-R_3$" should read -- $R_1-O-P-R_3$ --; line 16, delete "$R_1=,\neq R_2,\neq R_3$ and";
line 16, after "and $R_3$" add --, which may be the same or different,--;
line 52, after "said" add --refractory--; line 54, after "a" add --major--.
Column 17, line 12, delete "$M_1=,\neq M_2,$"; line 12, after "and $M_2$" add --, which may be the same or different,--.

Signed and Sealed this

Thirteenth Day of August, 1991

Attest:

HARRY F. MANBECK, JR.

Attesting Officer

Commissioner of Patents and Trademarks